(12) United States Patent
Kamath et al.

(10) Patent No.: US 11,150,425 B2
(45) Date of Patent: Oct. 19, 2021

(54) DOWNHOLE STRAIN SENSING CABLES

(71) Applicant: AFL Telecommunications LLC, Duncan, SC (US)

(72) Inventors: Rajesh Kamath, Kent, WA (US); Brett Villiger, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 303 days.

(21) Appl. No.: 16/302,388

(22) PCT Filed: Jun. 2, 2017

(86) PCT No.: PCT/US2017/035656
§ 371 (c)(1),
(2) Date: Nov. 16, 2018

(87) PCT Pub. No.: WO2017/210541
PCT Pub. Date: Dec. 7, 2017

(65) Prior Publication Data
US 2020/0319417 A1    Oct. 8, 2020

Related U.S. Application Data

(60) Provisional application No. 62/345,402, filed on Jun. 3, 2016.

(51) Int. Cl.
*G02B 6/44* (2006.01)
*E21B 47/007* (2012.01)
*E21B 47/135* (2012.01)

(52) U.S. Cl.
CPC .......... *G02B 6/4432* (2013.01); *E21B 47/007* (2020.05); *E21B 47/135* (2020.05); *G02B 6/4415* (2013.01); *G02B 6/4488* (2013.01)

(58) Field of Classification Search
CPC .. G02B 6/4432; G02B 6/4415; G02B 6/4488; F21B 47/007; F21B 47/135
See application file for complete search history.

(56) References Cited

U.S. PATENT DOCUMENTS

| | | | | |
|---|---|---|---|---|
| 4,687,293 A | * | 8/1987 | Randazzo | G02B 6/4402 385/128 |
| 5,883,857 A | * | 3/1999 | Pearce | G01V 1/201 367/20 |
| 5,892,176 A | * | 4/1999 | Findlay | E21B 17/206 174/102 R |

(Continued)

FOREIGN PATENT DOCUMENTS

WO  WO2015/038150 A1  3/2015
WO  WO2015/152929 A1  10/2015

OTHER PUBLICATIONS

AFL Telecommunications LLC; International Patent Application No: PCT/US2017/035656; International Search Report; dated Aug. 14, 2017; (3 pages).

*Primary Examiner* — Peter Radkowski
(74) *Attorney, Agent, or Firm* — Dority & Manning, P.A.

(57) ABSTRACT

A downhole strain sensing cable includes a core optical unit which includes a plurality of optical fibers. A fiber-reinforced polymer matrix layer surrounds and contacts the core optical unit. An extrusion layer surrounds and contacts the fiber-reinforced polymer matrix layer. An outer metal tube surrounds and contacts the extrusion layer.

20 Claims, 1 Drawing Sheet

(56) References Cited

U.S. PATENT DOCUMENTS

| | | | |
|---|---|---|---|
| 7,397,976 B2 * | 7/2008 | Mendez | E21B 47/06 385/12 |
| 7,787,525 B1 * | 8/2010 | Clark, Jr. | E21B 47/13 375/218 |
| 8,905,139 B2 * | 12/2014 | Arizmendi, Jr. | E21B 41/00 166/332.2 |
| 8,953,915 B2 * | 2/2015 | Sarchi | G01M 11/086 385/101 |
| 8,960,295 B2 * | 2/2015 | Arizmendi, Jr. | E21B 34/066 166/308.1 |
| 9,494,461 B2 * | 11/2016 | Hornman | G01V 1/40 |
| 9,766,119 B2 * | 9/2017 | Den Boer | G01H 9/004 |
| 10,139,269 B2 * | 11/2018 | Den Boer | G01H 9/004 |
| 2006/0165344 A1 * | 7/2006 | Mendez | G01L 11/025 385/13 |
| 2006/0260739 A1 * | 11/2006 | Varkey | B29C 48/13 156/244.12 |
| 2008/0118209 A1 * | 5/2008 | Varkey | H01B 13/18 385/101 |
| 2010/0116508 A1 * | 5/2010 | Oglesby | E21B 43/128 166/369 |
| 2012/0037360 A1 * | 2/2012 | Arizmendi, Jr. | E21B 23/04 166/250.01 |
| 2012/0037380 A1 * | 2/2012 | Arizmendi, Jr. | E21B 41/00 166/369 |
| 2012/0043092 A1 * | 2/2012 | Arizmendi, Jr. | E21B 43/14 166/369 |
| 2012/0082422 A1 * | 4/2012 | Sarchi | G01K 11/32 385/101 |
| 2013/0209044 A1 | 8/2013 | Lowell | |
| 2014/0060930 A1 * | 3/2014 | Zediker | E21B 7/15 175/16 |
| 2014/0150563 A1 * | 6/2014 | Lambert | G01M 11/086 73/800 |
| 2014/0345388 A1 * | 11/2014 | Den Boer | G01B 1/226 73/655 |
| 2016/0004024 A1 * | 1/2016 | Dowd | G02B 6/4488 385/112 |
| 2016/0237797 A1 * | 8/2016 | Arizmendi, Jr. | E21B 23/04 |
| 2016/0377476 A1 * | 12/2016 | Den Boer | G01V 1/226 73/655 |
| 2017/0370767 A1 * | 12/2017 | Den Boer | G01V 1/40 |

\* cited by examiner

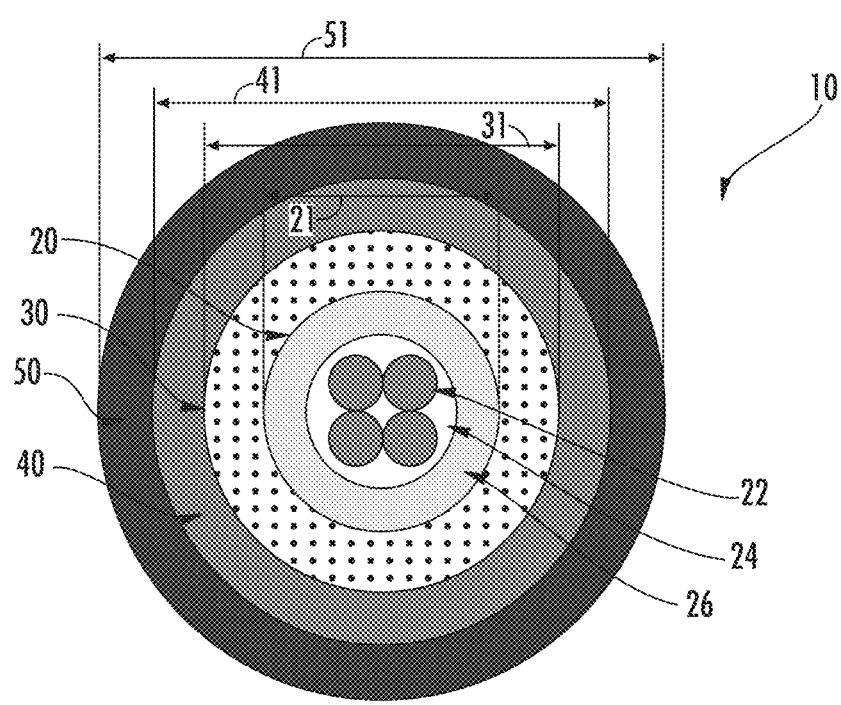

DOWNHOLE STRAIN SENSING CABLES

CROSS-REFERENCE TO RELATED APPLICATIONS

This application is a National Stage Patent Application of PCT/US2017/035656, filed on Jun. 2, 2017, which claims the benefit of priority to U.S. Provisional Patent Application No. 62/345,402, filed on Jun. 3, 2016, the disclosures of all of which are incorporated by reference herein in their entireties.

FIELD OF THE INVENTION

The present disclosure is generally directed to downhole strain sensing cables, and more particularly to downhole strain sensing cables having relatively small profiles and operable at extreme temperatures.

BACKGROUND OF THE INVENTION

In industries such as the oil and gas industry, wells are utilized to provide access to raw materials. A variety of cables may be utilized in the wells, and various of these cables may perform specified functions. One type of cable that is utilized in well settings is a downhole strain sensing cable. These cables are provided in the well to determine the strain that the well casing is exposed to during installation and operation processes. This strain can be correlated to earth movements, shifts and well wall movements. Typically, these cables are sealed to the well casings to monitor the movement of the well casing via resulting cable movement and strain determination.

One issue with known downhole strain sensing cables is vulnerability to loading at extreme temperature ranges. The exposure to extreme temperatures can cause the optical characteristics of the cables to be damaged and potentially cause cable failure. Further, cables which are designed to withstand such temperatures have relatively large profiles, making the cables heavy and intrusive.

Accordingly, improved downhole sensing cables are desired in the art. In particular, downhole sensing cables which can withstand extreme temperatures while maintaining proper optical characteristics, and which have relatively small profiles, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a downhole strain sensing cable is provided. The cable includes a core optical unit which includes a plurality of optical fibers. A fiber-reinforced polymer matrix layer surrounds and contacts the core optical unit. An extrusion layer surrounds and contacts the fiber-reinforced polymer matrix layer. An outer metal tube surrounds and contacts the extrusion layer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a cross-sectional view of a downhole strain sensing cable in accordance with one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure generally provides an improved downhole strain sensing cable. The cable includes a core optical unit which includes a plurality of optical fibers. A fiber-reinforced polymer matrix layer surrounds and contacts the core optical unit. An extrusion layer surrounds and contacts the fiber-reinforced polymer matrix layer. An outer metal tube surrounds and contacts the extrusion layer. In exemplary embodiments, a maximum outer diameter of the outer metal tube is less than 0.3 inches, such as between approximately 0.28 and approximately 0.22 inches, such as approximately 0.25 inches. Downhole strain sensing cables in accordance with the present disclosure advantageously can withstand extreme temperatures, such as at least up to between 150 degree Celsius and 165 degrees Celsius, while maintaining proper optical characteristics. Additionally, such cables in accordance with the present disclosure can advantageously have relatively small profiles.

Referring now to FIG. 1, a downhole strain sensing cable 10 in accordance with the present disclosure is illustrated. Cable 10 includes a core optical unit 20. The core optical unit 20 includes a plurality of optical fibers 22. Optical fibers 22 may be single mode or multi-mode optical fibers. In exemplary embodiments as illustrated, four optical fibers 22 are provided in the core optical unit 20. In particular exemplary embodiments, the four optical fibers 22 may include two single mode optical fibers 22 and two multi-mode optical fibers 22. Alternatively, one, two or three optical fibers 22 may be provided in the core optical unit 20 having any suitable combination of single mode and/or multi-mode optical fibers 22. The optical fibers 22 may in exemplary embodiments be stranded along a length of the cable 10, such as having a lay length of between 90 millimeters and 350 millimeters, such as between 130 millimeters and 250 millimeters, such as between 140 millimeters and 160 millimeters, such as approximately 150 millimeters. Alternatively, the optical fibers 22 may extend generally linearly along the length of the cable 10.

A cladding 24 may surround and encase the optical fibers 22. The cladding in exemplary embodiments may be formed from silicone. A jacket 26 may surround and contact the cladding 24. The jacket 26 may be formed from a suitable fluoropolymer, such as a polymethylpentene (i.e. TPX® manufactured by Mitsui Chemicals, Inc.).

Notably, the cladding 24 and jacket 26 may be free from reinforcing fibers (or any fibers other than optical fibers 22).

The core optical unit 20 (such as the jacket 26 thereof) may have a relatively small maximum outer diameter 21. For example, the maximum outer diameter 21 may be between 0.6 millimeters and 1.09 millimeters, such as between 0.7 millimeters and 1 millimeter, such as between 0.8 millimeters and 0.9 millimeters, such as approximately 0.84 millimeters.

A fiber-reinforced polymer matrix layer 30 may surround and contact the core optical unit 20 (such as the jacket 26 thereof). The layer 30 advantageously protects the unit 20 from sudden impacts and reduces the risk of damage to the optical fibers 22. The layer 30 may include a plurality of fibers embedded in a polymer matrix. The fiber may, for example, be glass fibers or alternatively carbon fibers or other suitable reinforcing fibers. The polymer matrix may be formed from a suitable thermoplastic or thermoset, such as in exemplary embodiments a polyester (such as an unsaturated polyester) resin, an acrylic-based resin, a terephthalic resin, or a vinyl ester resin.

The layer 30 may have a relatively small maximum outer diameter 31. For example, the maximum outer diameter 31 may be between 3 millimeters and 3.3 millimeters, such as between 3.1 millimeters and 3.3 millimeters, such as approximately 3.2 millimeters.

An extrusion layer 40 may surround and contact the fiber-reinforced polymer matrix layer 30. The extrusion layer 40 generally seals the fiber-reinforced polymer matrix layer 30 within an outer metal tube 50. The extrusion layer 40 may be formed from an extrusion of a foamed polymer, such as in exemplary embodiments a polypropylene. Notably, the extrusion layer 40 may be free from reinforcing fibers.

The layer 40 may have a relatively small maximum outer diameter 41. For example, the maximum outer diameter 41 may be between 4 millimeters and 4.8 millimeters, such as between 4.2 millimeters and 4.6 millimeters, such as between 4.5 millimeters and 4.6 millimeters, such as approximately 4.57 millimeters.

An outer metal tube 50 may surround and contact the extrusion layer 40. The outer metal tube 50 protects the various interior components 20, 30, 40, thus acting as a protective layer for the cable 10 generally. The outer metal tube 50 may be the outermost layer defining an exterior surface of the cable 10. In exemplary embodiments, the outer metal tube 50 is formed from a steel, such as a stainless steel. 825, 316 or 625 grade steels are suitable for use as outer metal tube 50.

The outer metal tube 50 may have a relatively small maximum outer diameter 51. For example, the maximum outer diameter 51 may be less than 0.3 inches, such as between approximately 0.28 and approximately 0.22 inches, such as approximately 0.25 inches.

In general, due to the contact therebetween as discussed above, the layers 20, 30, 40, 50 of the cable 10 advantageously behave and move as a single unit when strain-inducing events are encountered, such as earth movements, shifts and well wall movements. Further, as discussed herein, cables 10 having layers 20, 30, 40, 50 as discussed herein can advantageously withstand relatively high temperatures, such as at least up to between 150 degree Celsius and 165 degrees Celsius, while maintaining proper optical characteristics.

Cables 10 in accordance with the present disclosure may advantageously be rated to 150 degrees Celsius, such as in some embodiments to 165 degrees Celsius. Such rating may be based on BOTDA and tensile tests after ageing at 150 degrees Celsius or 165 degrees Celsius. A cable is considered rated to 150 degrees Celsius or 165 degrees Celsius in accordance with the present disclosure if a sample of the cable aged to 150 degrees Celsius or 165 degrees Celsius as discussed herein has test results that are equal to or better than those of a comparative room temperature aged-sample.

Ageing and tensile testing performed on cables 10 in accordance with the present disclosure were performed in accordance IEC-60794-1-2 standards. Cables being qualified to 150 degree Celsius or 165 degree Celsius ratings were constructed in 1300 meter sections having four optical fibers as follows: one VERRILLON® FBR00190 multi-mode optical fiber, one VERRILLON® FBR00248 multi-mode optical fiber, one VERRILLON® FBR00270 single mode fiber, and one VERRILLON® FBR00293 single mode fiber. A silicone cladding and TPX jacket surround the optical fibers. A fiber-reinforced polymer matrix layer which includes glass fibers embedded in an unsaturated polyester-based resin surrounds the jacket, and a foamed polypropylene extrusion layer surrounds the fiber-reinforced polymer matrix layer. A stainless steel outer tube surrounds the extrusion layer. A maximum outer diameter of the stainless steel outer tube is approximately 0.25 inches, and a maximum outer diameter of the jacket is approximately 0.84 millimeters.

Ageing was performed by exposing cables to 150 degree Celsius temperature and 165 degree Celsius temperature, respectively, for 30 days. For tensile testing, samples were tested in increments of 50 pounds and held at each load for a period of 5 minutes. Test results for 150 degree Celsius- and 165 degree Celsius-rated samples were equal to or better than those of a comparative room temperature aged-sample. For example, all cables began to yield at 2200 lbf and at 0.48% strain, indicating no degradation in performance for the 150 degree Celsius- and 165 degree Celsius-rated samples. In addition, the breaking strengths of the room temperature aged-sample and the 150 degree Celsius-rated sample were the same, and the breaking strength of the 165 degree Celsius-rated sample was approximately 1000 lbf higher.

BOTDA testing was performed concurrently with ageing. Test results for 150 degree Celsius- and 165 degree Celsius-rated samples were equal to or better than those of a comparative room temperature aged-sample. For example, BOTDA strain levels indicated no changes in the 150 degree Celsius- and 165 degree Celsius-rated samples as compared to the room temperature aged-sample.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A downhole strain sensing cable, comprising:
   a core optical unit comprising at least one optical fiber;
   a fiber reinforced polymer matrix layer surrounding and contacting the core optical unit;
   an extrusion layer surrounding and contacting the fiber reinforced polymer matrix; and
   an outer metal tube surrounding and contacting the extrusion layer.

2. The downhole strain sensing cable of claim 1, wherein less than or equal to four optical fibers are included in the core optical unit.

3. The downhole strain sensing cable of claim 1, wherein the at least one optical fiber comprises at least one single mode optical fiber and at least one multi-mode optical fiber.

4. The downhole strain sensing cable of claim 1, wherein the at least one optical fiber is stranded along a length of the cable with a lay length of between 90 millimeters and 350 millimeters.

5. The downhole strain sensing cable of claim 1, wherein the core optical unit further comprises a cladding and a jacket, the cladding surrounding and encasing the at least one optical fiber, the jacket surrounding and contacting the cladding.

6. The downhole strain sensing cable of claim 5, wherein the cladding is formed from silicone and the jacket is formed from a fluoropolymer.

7. The downhole strain sensing cable of claim 5, wherein the cladding and jacket are free from reinforcing fibers.

8. The downhole strain sensing cable of claim 1, wherein the polymer matrix of the fiber reinforced polymer matrix layer comprises one of a polyester resin, an acrylic-based resin, a terephthalic resin, or a vinyl ester resin.

9. The downhole strain sensing cable of claim 1, wherein the extrusion layer is formed from a foamed polymer extrusion.

10. The downhole strain sensing cable of claim 1, wherein the extrusion layer is free from reinforcing fibers.

11. The downhole strain sensing cable of claim 1, wherein the outer metal tube is formed from a steel.

12. The downhole strain sensing cable of claim 11, wherein the steel is a stainless steel.

13. The downhole strain sensing cable of claim 1, wherein a maximum outer diameter of the outer metal tube is less than 0.3 inches.

14. The downhole strain sensing cable of claim 1, wherein the cable is rated to 150 degrees Celsius.

15. A downhole strain sensing cable, comprising:
    a core optical unit comprising at least one optical fiber, a cladding, and a jacket, the cladding surrounding and encasing the at least one optical fiber, the jacket surrounding and contacting the cladding;
    a fiber reinforced polymer matrix layer surrounding and contacting the core optical unit;
    an extrusion layer surrounding and contacting the fiber reinforced polymer matrix; and
    an outer steel tube surrounding and contacting the extrusion layer,
    wherein a maximum outer diameter of the outer metal tube is less than 0.3 inches and the cable is rated to 150 degrees Celsius.

16. The downhole strain sensing cable of claim 15, wherein the at least one optical fiber comprises at least one single mode optical fiber and at least one multi-mode optical fiber.

17. The downhole strain sensing cable of claim 15, wherein the cladding is formed from silicone and the jacket is formed from a fluoropolymer.

18. The downhole strain sensing cable of claim 15, wherein the polymer matrix of the fiber reinforced polymer matrix layer comprises one of a polyester resin, an acrylic-based resin, a terephthalic resin, or a vinyl ester resin.

19. The downhole strain sensing cable of claim 15, wherein the extrusion layer is formed from a foamed polymer extrusion.

20. The downhole strain sensing cable of claim 15, wherein the outer metal tube is formed from a steel.

* * * * *